US009898539B2

(12) United States Patent
Kawamura et al.

(10) Patent No.: US 9,898,539 B2
(45) Date of Patent: Feb. 20, 2018

(54) DEVICE MANAGEMENT APPARATUS AND DEVICE SEARCH METHOD

(71) Applicant: OMRON Corporation, Kyoto-shi, Kyoto (JP)

(72) Inventors: Atsushi Kawamura, Tokyo (JP); Atsushi Hisano, Kyoto (JP)

(73) Assignee: OMRON Corporation, Kyoto (JP)

( * ) Notice: Subject to any disclaimer, the term of this patent is extended or adjusted under 35 U.S.C. 154(b) by 231 days.

(21) Appl. No.: 14/391,783

(22) PCT Filed: Mar. 8, 2013

(86) PCT No.: PCT/JP2013/056400
§ 371 (c)(1),
(2) Date: Oct. 10, 2014

(87) PCT Pub. No.: WO2013/153890
PCT Pub. Date: Oct. 17, 2013

(65) Prior Publication Data
US 2015/0142848 A1 May 21, 2015

(30) Foreign Application Priority Data

Apr. 12, 2012 (JP) ................................ 2012-091022

(51) Int. Cl.
*G08G 1/04* (2006.01)
*G06F 17/30* (2006.01)
*H04Q 9/00* (2006.01)

(52) U.S. Cl.
CPC .... *G06F 17/3087* (2013.01); *G06F 17/30864* (2013.01); *G08G 1/04* (2013.01); *H04Q 9/00* (2013.01); *H04Q 2209/40* (2013.01)

(58) Field of Classification Search
None
See application file for complete search history.

(56) References Cited

U.S. PATENT DOCUMENTS 5,724,040 A * 3/1998 Watnick ................. G01S 7/003
342/26 D
7,502,619 B1 * 3/2009 Katz ....................... G01S 5/02
340/531

(Continued)

FOREIGN PATENT DOCUMENTS

| EP | 2131292 A1 | 12/2009 |
| JP | 2007-300571 A | 11/2007 |
| JP | 2007-300572 A | 11/2007 |

OTHER PUBLICATIONS

International Search Report issued in PCT/JP2013/056400 dated May 14, 2013 (2 pages).

(Continued)

*Primary Examiner* — Wilson Lee
(74) *Attorney, Agent, or Firm* — Osha Liang LLP

(57) ABSTRACT

In a technology for allowing accurate and easy search of a device which satisfies a request of a user from among a large number of devices present at various places, an area ID capable of uniquely identifying a target area of the device is registered in a storage section as information on the device. A device search request from the user includes an area condition for identifying an area in which exertion of an operation by the device is desired by the user as a search condition. A matching process section determines the device to be extracted by comparing the target area identified by the area ID of each device with the area condition included in the device search request.

10 Claims, 7 Drawing Sheets

(56) References Cited

U.S. PATENT DOCUMENTS

| | | | |
|---|---|---|---|
| 2002/0156917 A1* | 10/2002 | Nye | H04L 63/104 709/238 |
| 2002/0164962 A1* | 11/2002 | Mankins | A61K 38/2221 455/99 |
| 2006/0142933 A1* | 6/2006 | Feng | G07B 15/063 701/117 |
| 2008/0013789 A1* | 1/2008 | Shima | G06K 9/00798 382/104 |
| 2008/0071465 A1* | 3/2008 | Chapman | G01C 21/3691 701/117 |
| 2008/0240160 A1 | 10/2008 | Ishii | |
| 2008/0295171 A1* | 11/2008 | Singh | H04L 63/1416 726/23 |
| 2011/0002314 A1* | 1/2011 | Choi | H04W 72/0453 370/338 |
| 2012/0246214 A1* | 9/2012 | Ogawa | G06F 9/5094 709/201 |
| 2013/0151135 A1* | 6/2013 | Aubrey | G08G 1/00 701/118 |
| 2013/0235203 A1* | 9/2013 | Billington | G06K 9/2036 348/148 |

OTHER PUBLICATIONS

Extended European Search Report issued in corresponding European Application No. 13775148.3 dated Nov. 5, 2015 (9 pages).

\* cited by examiner

FIG. 5(a)

SEARCH CONDITION:

I WANT TO KNOW CONGESTION SITUATION IN AREA WITHIN 100 m FROM KYOTO STATION AT 6 PM.

SEARCH

FIG. 5(b)

AREA : WITHIN 100 m FROM KYOTO STATION
TIME : 18:00
CONTENT: CONGESTION

SEARCH

FIG. 5(c)

SEARCH RESULT:

| ID | SENSOR TYPE | CHARGE | DEGREE OF MATCHING | .... |
|---|---|---|---|---|
| xx | TRAFFIC CONGESTION SENSOR | xx YEN | 90% | .... |
| xx | INFRARED BEACON | xx YEN | 75% | .... |
| xx | CAMERA | xx YEN | 72% | .... |
| : | : | : | : | |
| xx | ETC | xx YEN | 53% | .... |
| : | | | | |

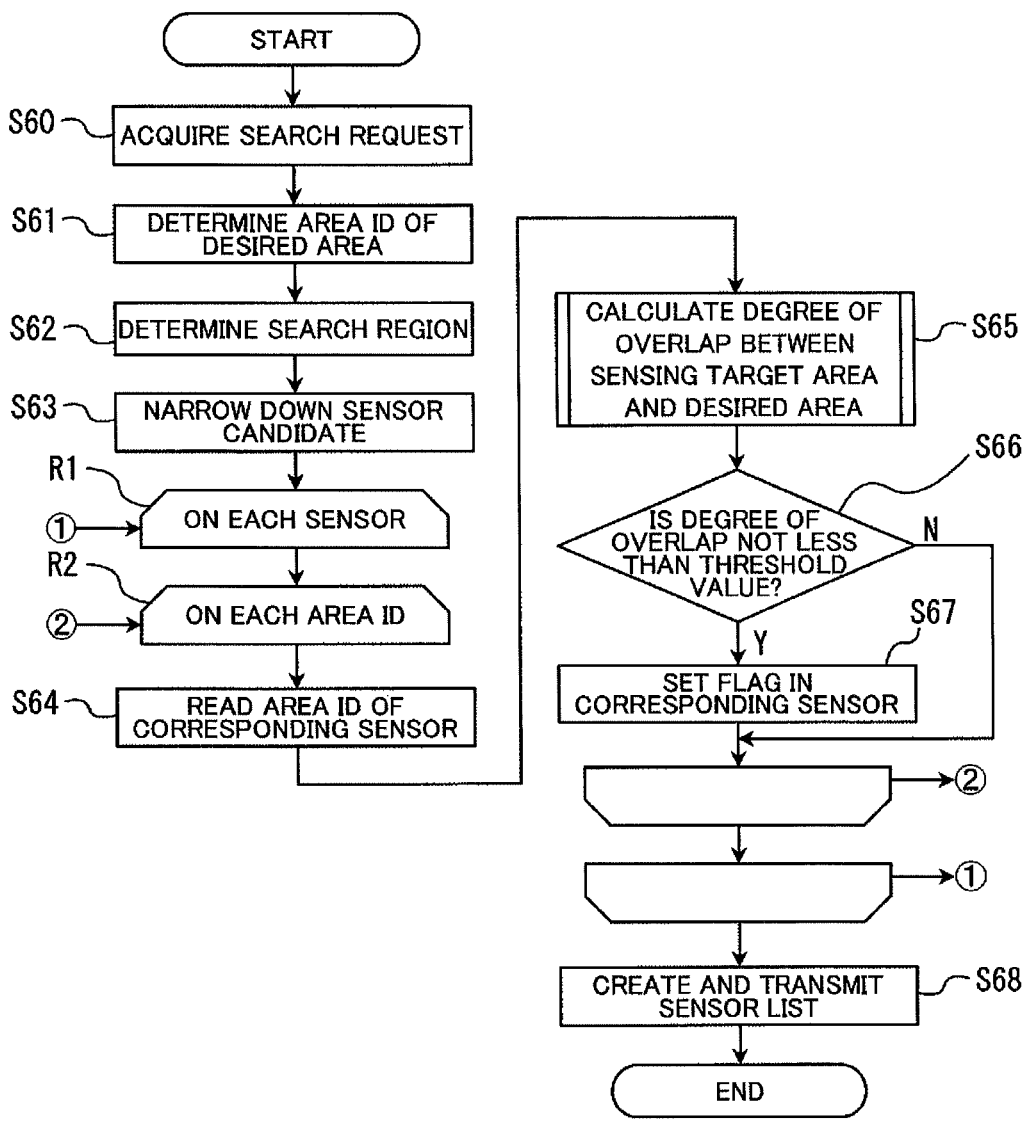

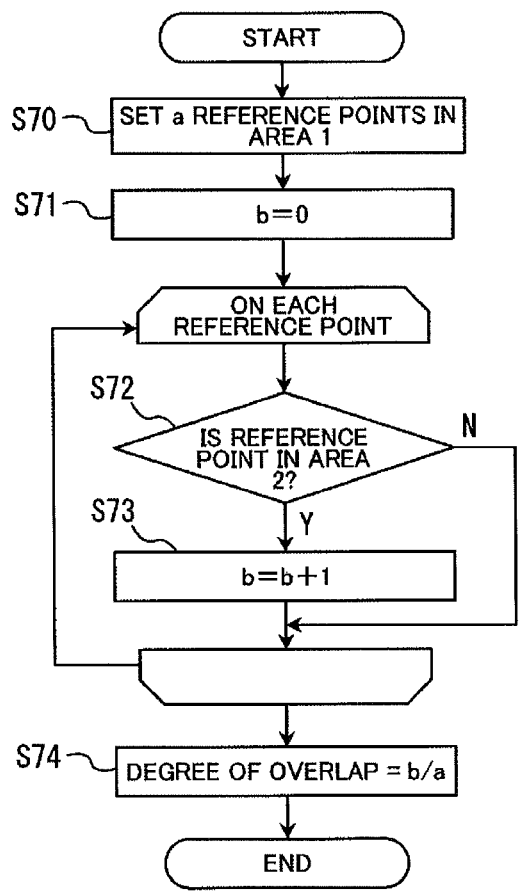

DEVICE MANAGEMENT APPARATUS AND DEVICE SEARCH METHOD

TECHNICAL FIELD

The present invention relates to a technology for allowing easy search of a device which suits a purpose from among a large number of devices present at various places.

BACKGROUND ART

As a means for realizing a ubiquitous society, a sensor network receives attention. The sensor network is a technology that disposes sensor devices each having a detection function and a communication function at various places and networks the sensor devices to thereby allow the collection, management, and seamless use of sensing data (see Patent Literatures 1 and 2). When the sensor network is implemented, it becomes easy to quickly grasp a situation at every place from anywhere, and hence wide application of the sensor network to not only industrial fields such as a production site and physical distribution but also fields related to social systems such as transportation and various infrastructures and living such as medical treatment and education is considered to be promising.

CITATION LIST

Patent Literature

PTL 1: Japanese Patent Application Laid-open No. 2007-300571
PTL 2: Japanese Patent Application Laid-open No. 2007-300572

SUMMARY OF INVENTION

Technical Problem

The sensor network has an advantage that, as the number of sensors is increased, detection performance (resolution, the type of detectable information, and the like) is enhanced. However, when the number of choices is extremely large, it becomes difficult to find a sensor optimum for achievement of a purpose, and convenience for a user may be reduced. To cope with this, it is desired to provide a search mechanism which receives the request of the user (e.g., an area to be sensed and desired information) and extracts the sensor that satisfies the request on a system side.

However, the conventional system has the following problem. The request of the user who uses the sensor network is usually made by designating an area as a sensing target such as, e.g., a request that "I want to know the congestion situation of Kyoto Station Platform No. 0", while a database on the system side manages the installation place (or presence place) of the sensor in most cases. However, the installation place of the sensor does not necessarily match the target area sensed by the sensor. That is, even if a monitoring camera is installed at "Kyoto Station Platform No. 0", the camera may monitor the arrival and departure of trains, a platform on the opposite side, or the situation at a ticket gate instead of Platform No. 0. Therefore, in the case of the conventional system, after candidates are extracted based on the installation place of the sensor (i.e., after sensors installed near a sensing desired area are selected as candidates), the user oneself needs to check parameters such as the installation direction and range of each sensor and determine whether or not information in the desired area can be sensed.

Although the description has been given by using the sensor as an example thus far, the same problem can arise in the case of the network of a device such as an actuator (or a controller). This is because the "sensor" and the "actuator" are different from each other in that the sensor "detects (acquires) a state" and the actuator "changes a state", but the "sensor" and the "actuator" are similar to each other in that some operation is performed on the target area in a predetermined region, and the installation place of the device does not necessarily match the target area.

The present invention has been achieved in view of the above circumstances, and an object thereof is to provide a technology for allowing accurate and easy search of a device which satisfies the request of the user from among a large number of devices present at various places.

Solution to Problem

In order to achieve the above object, the present invention manages the target area of each device by using identification information (referred to as an "area ID" in the present invention) defined so as to be capable of uniquely identifying an area (a point, line, plane, or space), and allows search of the device based on whether or not the target area (not installation place) of the device matches the area desired by the user. The target area of the device is an area which is to have a cause-and-effect relationship with the operation of the device. The cause-and-effect relationship includes a cause-and-effect relationship in which the output value of the device is determined according to the state of the target area (sensing), and a cause-and-effect relationship in which the state of the target area is determined by the output of the device (actuator).

Specifically, the present invention is a device management apparatus managing a plurality of devices present at different places including a storage section in which information on each device is registered, an acquisition section which acquires a device search request from a user, a matching process section which performs matching between a search condition included in the device search request and the information on each device registered in the storage section, thereby extracting the device satisfying the search condition, and a search result presentation section which presents an extraction result of the matching process section to the user, wherein an area ID capable of uniquely identifying a target area of the device is registered in the storage section as the information on the device, the device search request includes an area condition for identifying an area in which exertion of an operation by the device is desired by the user as the search condition, and the matching process section determines the device to be extracted by comparing the target area identified by the area ID of each device with the area condition included in the device search request.

Although it is assumed that various types of devices or devices having different owners coexist depending on the configuration or use of the device network, according to the configuration of the present invention, the "area ID" is registered as one of the information items on the device (hereinafter simply referred to as "device information"), and it is thereby possible to collectively manage the target areas of all of the devices. In addition, since the area ID is defined so as to be capable of uniquely identifying the target area, unlike the conventional system, it is possible to represent the area serving as the target on which the operation is actually exerted by the device instead of the installation position of the device. Therefore, it becomes possible to search the device which covers the area desired by the user with high accuracy. Note that the operation exerted on the target area by the device may be detection of the state of the target area or changing of the state of the target area.

The matching process section preferably calculates a degree of overlap between the target area identified by the area ID and the area identified by the area condition, and determines the device to be extracted based on magnitude of the degree of overlap. For example, by extracting the device having the degree of overlap larger than a predetermined value and extracting the predetermined number of devices in descending order of the degree of overlap; it becomes possible to present the device having a high possibility of matching the desire of the user as the search result. In the case where position information indicative of an installation position of the device is registered in the storage section as the information on the device, the matching process section may narrow down the device serving as a candidate based on the installation position of the device, and then execute the extraction based on the magnitude of the degree of overlap with the candidate, obtained as a result of the narrowing down, serving as a target. Since the calculation and evaluation of the degree of overlap in a three-dimensional space require a large calculation amount, when the scale of the network (the number of devices) is increased, the processing load of the matching may be increased. To cope with this, by performing the narrowing down using the installation position which requires a small calculation amount first, it is possible to reduce the processing load of the matching and achieve a reduction in search time.

With regard to the device having a plurality of the target areas, a plurality of the area IDs corresponding to the plurality of the target areas are preferably registered in the storage section. For example, a mobile or scanning device and a camera capable of PTZ (pan-tilt-zoom) control correspond to the above device. Herein, with regard to the device, the target area of which the user can control, a control parameter used to change the target area to the corresponding target area is preferably registered in the storage section in association with each of the plurality of the area IDs and, further, when the matching process section extracts the device which requires control for changing the target area, the search result presentation section preferably presents information on the control parameter for the device to the user together with the extraction result. With this, a use mode in which the user (the user of the device) directly or indirectly controls the device to thereby sense the desired area or output information to the desired area is allowed, and the convenience of the system is thereby improved.

Note that the present invention can be regarded as the device management apparatus having at least any of the above means, and can also be regarded as a device network system configured by the device management apparatus and a plurality of the devices. In addition, the present invention can be regarded as a device search method including at least any of the above processes, and can also be regarded as a program for causing a computer to execute individual steps of the device search method or a storage medium recording the program.

Advantageous Effects of Invention

According to the present invention, it is possible to accurately and easily search the device which satisfies the request of the user from among a large number of the devices present at various places.

BRIEF DESCRIPTION OF DRAWINGS

FIG. 5 is a view for explaining an example of specific use of a search service;

FIG. 6 is a flowchart showing the flow of a sensor search process; and

FIG. 7 is a flowchart showing the flow of a calculation process of the degree of overlap.

DESCRIPTION OF EMBODIMENTS

<System Configuration>

Figure 1:
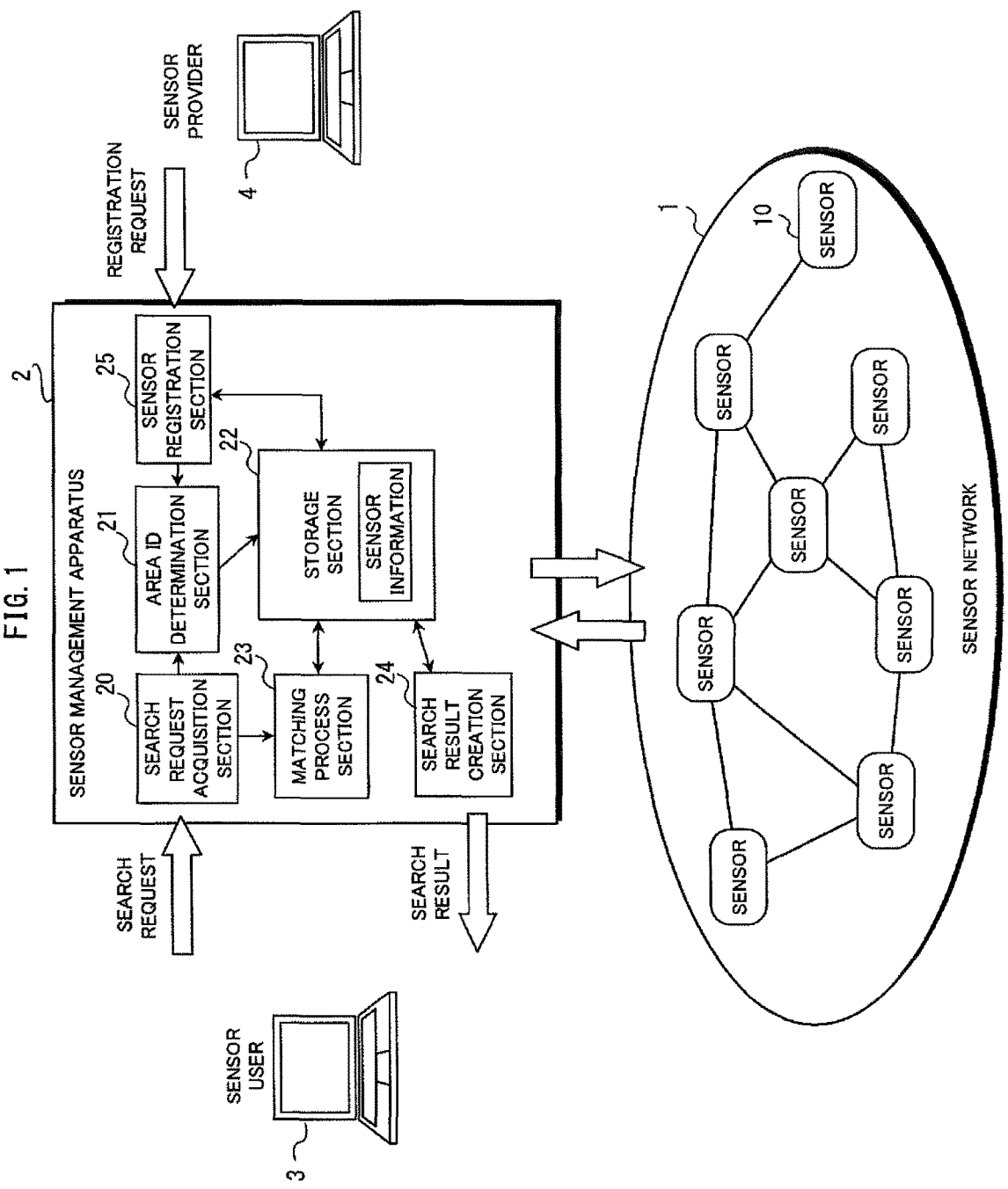
FIG. 1 is a view showing the configuration of a sensor network system.

With reference to FIG. 1, a description will be given of an example of the configuration of a sensor network system as an embodiment of a device network system according to the present invention.

The sensor network system is configured by a sensor network 1 as a type of a device network, and a sensor management apparatus 2 as a device management apparatus. The sensor network 1 is a network configured by a large number of sensors 10 present at various places. The structure and communication system and the like of the network can be arbitrarily designed, and are not particularly limited. Each sensor 10 can communicate with the sensor management apparatus 2 via a wide area network such as, e.g., the Internet or the like. The sensor management apparatus 2 is a server apparatus which manages information on the individual sensors 10 constituting the sensor network 1 and information collected from the individual sensors, and the like, and provides various services (device search is one of the services) for a user who desires to use the sensor 10. The user can access the services provided by the sensor management apparatus 2 from a user terminal 3 through the wide area network such as the Internet or the like. Incidentally, all of a large number of the sensors 10 constituting the sensor network 1 are not necessarily owned by an administrator of the sensor management apparatus 2, and many people and organizations such as individuals and business entities other than the administrator can own or operate and manage the sensors (hereinafter a person or an organization which owns or operates and manages the sensor is referred to as a "sensor provider"). Therefore, the sensor management apparatus 2 has a function of registering a new sensor in the present system and a function of changing the information on the sensor as a function for the sensor provider. In addition, although not described in detail in the present embodiment, the sensor management apparatus 2 preferably has a function of mediating between the sensor user and the sensor provider (check/mediation of a use condition and a provision condition, billing to the user and payment to the provider, and the like).

Each of the sensors 10 is a device for detecting (acquiring) the state of a sensing target area, and any type of information to be sensed or outputted, any detection method, and any detection means can be used. Examples thereof include an image sensor, a temperature sensor, a humidity sensor, an illumination sensor, a force sensor, a sound sensor, an RFID sensor, an infrared sensor, an attitude sensor, a rain sensor, a radioactivity sensor, and a gas sensor. In addition, in the case where one information item can be obtained by combining a plurality of sensors, the plurality of sensors can be handled as one sensor in a virtual manner.

The sensor management apparatus 2 has functions such as a search request acquisition section 20, an area ID determination section 21, a storage section (database) 22, a matching process section 23, a search result creation section 24, and a sensor registration section 25. The sensor management apparatus 2 can be configured by a computer which includes a CPU, a main storage apparatus (memory), an auxiliary storage apparatus (HDD, SSD, or the like), a communication apparatus, an input apparatus, and a display apparatus in terms of hardware. Individual functional blocks shown in FIG. 1 are embodied by loading a computer program stored in the auxiliary memory apparatus into the main storage apparatus and executing the program using the CPU. Note that the sensor management apparatus 2 may be configured by a single computer or can also be configured by a plurality of computers which cooperate with each other.

As the user terminal 3, for example, a personal computer, a cellular phone, a smartphone, and a slate device can be used. Note that, in the present embodiment, an example in which the user performs sensor search via the Internet is shown, but a configuration may also be adopted in which the sensor management apparatus itself is operated by the user, or a part or all of the functions of the sensor management apparatus is implemented on the side of the user terminal 3. As a terminal 4 of the sensor provider, for example, the personal computer, the cellular phone, the smartphone, and the slate device can be used.

<Sensor Registration>

Figure 2:
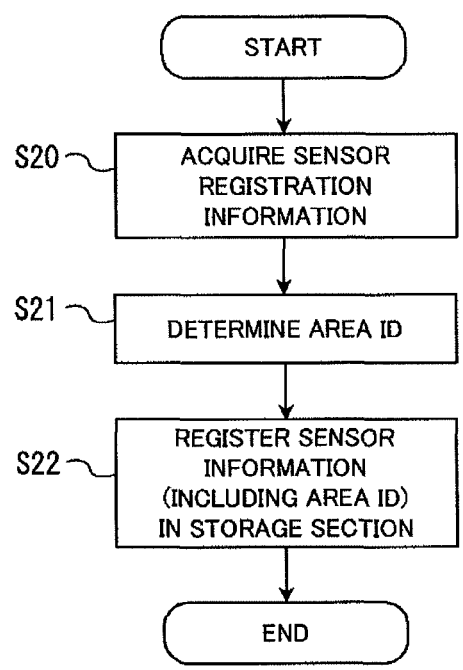
FIG. 2 is a flowchart showing the flow of a sensor registration process.
Figure 3:
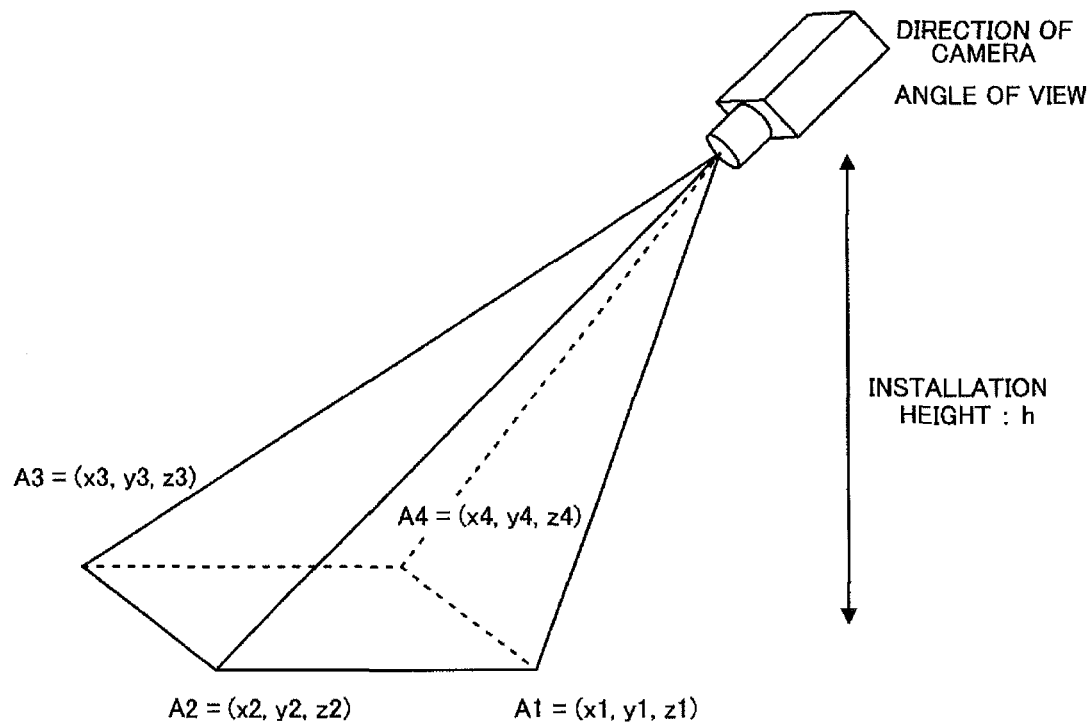
FIG. 3 is a view schematically showing a sensing target area of a sensor.
Figure 4:
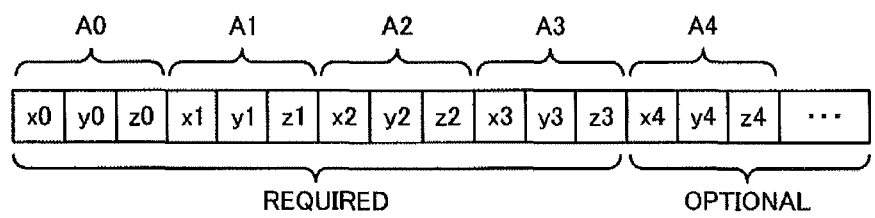
FIG. 4 is a view schematically showing an example of a data structure of an area ID.

With reference to FIGS. 2 to 4, an example of a sensor registration process will be described. FIG. 2 is a flowchart showing the flow of the sensor registration process executed in the sensor management apparatus 2, FIG. 3 is a view schematically showing a sensing target area of the sensor, and FIG. 4 is a view schematically showing an example of a data structure of an area ID. Herein, as an example of the sensor, a monitoring camera having a PTZ (pan-tilt-zoom) function is used.

The sensor (monitoring camera) provider can access a sensor registration service of the sensor management apparatus 2 by using the terminal 4 via the network. The sensor registration section 25 presents a screen (not shown) to which information required to register the sensor is inputted, and asks the provider to input the information (Step S20). The information required to register the sensor includes information on the provider (e.g., name or denomination of the provider), information on the sensor (e.g., the type, ability, installation position, target area, and network address of the sensor), and provision conditions (e.g., a use purpose, available time, and a use charge). Note that, among the information items on the sensor, manual inputting of the information item which can be automatically obtained from the sensor by the provider can be omitted. For example, coordinates of the installation position may be obtained from the sensor in the case of the sensor having a GPS (Global Positioning System) and, in the case where various information items such as the installation position, the installation direction (angle), and the ability are stored in the internal memory of the sensor, these information items may be read from the sensor.

Next, the area ID determination section 21 determines the area ID of the sensor based on the information on the target area acquired in Step S20 (Step S21). The area ID is identification information for uniquely identifying the sensing target area of the sensor. The target area is represented by a point, a line, a plane, or a space (i.e., 0 to three-dimensional areas). The number of dimensions of the target area is appropriately set according to the type of the sensor and the like.

In the case of a camera, as shown in FIG. 3, the sensing target area (shooting range) can be defined with a pentahedron having five points A0 to A4 as vertexes. For example, in the case where information items such as the installation position (A0) of the camera, the installation height (h) of the camera, the direction (angle) of the camera, and the angle of view of the camera are obtained in Step S20, the coordinates A1 to A4 can be calculated geometrically from the field of view and installation surface of the camera. Note that, in the case where it is not proper to include the installation surface in the target area (the case where the installation surface is at a long distance or infinity, the case where only a subject or wall surface is included in the angle of view, or the like), the provider is asked to input a shooting distance (a distance from the camera in an optical axis direction) or the like in Step S20, and the target area may be defined with a quadrangular pyramid having the installation position of the camera (A0) as a vertex and the shooting distance as the height. Alternatively, the shooting range may be calculated by allowing the provider oneself to designate the coordinates of the vertexes A0 to A4, measuring the shooting range using a distance sensor provided in the camera, or analyzing an image obtained using the camera.

FIG. 4 shows an example of the area ID determined by the area ID determination section 21. In the present embodiment, the target area is defined with the polyhedron, and the area ID includes data streams indicative of the coordinates of the vertexes of the polyhedron. The example of FIG. 4 shows data having a structure in which three-dimensional coordinate values (x, y, z) of the individual vertexes A0, A1, A2, A3, A4 . . . are successively described. Since at least four points are required in order to express the three-dimensional space (polyhedron), the coordinate values of four points are essential among data items of the area ID, and a data item on the fifth or subsequent point is optional. The value of each point may be an absolute coordinate or a relative coordinate. In addition, the value of each point may be represented by latitude/longitude/height instead of the xyz coordinates, and may also be represented by a standard format of the GPS. In the case where the target area is three-dimensional (space), the coordinate values of four points are essential in the area ID. However, the coordinate values of at least three points may be appropriately required in the case where the target area is two-dimensional (plane), the coordinate values of at least two points may be appropriately required in the case where the target area is one-dimensional (line), and the coordinate value of only one point may be appropriately required in the case where the target area is zero-dimensional (point).

When the area ID is determined, the sensor registration section 25 registers the various information items received in Step S20 and the area ID in the storage section 22 (Step S22). With this, the sensor registration process is completed.

In the case of the sensor capable of changing the target area such as a mobile sensor or a movable sensor, the area ID may be determined for each of the target areas which can be adopted by the sensor, and a plurality of the area IDs may be appropriately registered in the storage section 22. In this case, a control parameter of the sensor used to change the target area may be appropriately registered in the storage section 22 together with the area ID. For example, in the case of the camera capable of PTZ control, parameters of the pan, tilt, and zoom and the like and the area IDs corresponding to the individual parameters are registered together.

<Sensor Search>

Next, a description will be given of a sensor search service provided by the sensor management apparatus 2. The sensor search service is a service for facilitating search of the sensor optimum for the achievement of the purpose from among a large number of the sensors 10 constituting the sensor network 1 by the user. First, an example of specific use of the search service will be described by using FIG. 5.

When the user accesses the sensor search service by using the user terminal 3, a search condition input screen shown in FIG. 5 (a) is displayed. In this screen, it is possible to input the search condition (search purpose) in the form of a free sentence such as, e.g., "I want to know a congestion situation in an area within 100 m from Kyoto Station at 6 PM". FIG. 5(b) shows another example of the search condition input screen. In the case of this screen, the area, time, and content are inputted indifferent boxes. When a search button is pressed, a search request is transmitted to the sensor management apparatus 2 from the user terminal 3, and a search process (matching process) is executed in the sensor management apparatus 2. The detail of the search process will be described later.

FIG. 5(c) shows an example of a search result screen returned from the sensor management apparatus 2. As a means for grasping the congestion situation of a road, for example, a traffic congestion sensor, an infrared beacon, an image sensor (camera), and an entry record of ETC are assumed. In the sensor search service, all of the sensors which may satisfy the search condition inputted by the user are searched, and the sensors are displayed in list form in descending order of the degree of matching with the search condition. With regard to the display order in the list, a configuration may be adopted in which the user can sort the list according to a condition designated by the user such as the type of the sensor or the descending or ascending order of the charge. In addition, the sensor list also displays information such as specifications of each sensor, a provision condition, a use charge, and the provider of the sensor on an as needed basis. The user looks at the list presented as the search result, and can select the sensor to be used while weighing the sensors.

As can be seen from the example of FIG. 3, the installation position (or the presence position) of the sensor 10 does not necessarily match the target area sensed by the sensor 10. To cope with this, in the sensor search service of the present system, the sensor search can be performed by comparing an area condition inputted by the user with the target area of the sensor. With this, it is possible to extract the sensor which suits the purpose and desire of the user with high accuracy. In addition, a purpose achievement means which is not envisioned by the user is listed (recommended), and hence the use opportunity of the user is expected to be increased.

(Retrieval Process Flow)

FIG. 6 shows the flow of the sensor search process by the sensor management apparatus 2.

First, the search request acquisition section 20 acquires the search request from the user terminal 3 (Step S60). Subsequently, the area ID determination section 21 converts the area condition (information for identifying the area of which sensing is desired by the user) included in the search request to the area ID (Step S61). The definition of the area ID and the data structure are the same as those described above. The area condition is converted to the area ID in order to unify the management of the area information in the matching process described later. Note that, e.g., in the case where the unification is not necessary, Step S61 may be omitted. In addition, in the case where the user designates the area ID as the area condition, Step S61 can also be omitted.

Next, the matching process section 23 determines a region where sensor search is performed based on the area condition designated by the user (Step S62). For example, the desired area designated as the area condition and its surroundings L [m] may be determined as a search region. The value of L as the margin may be appropriately set according to the scale of the sensor network and the type of the sensor (detectable distance) and the like. Subsequently, in Step S63, the matching process section 23 selects, as search candidates, only the sensors installed in the search region determined in Step S62 from among all of the sensors registered in the storage section 22. With this, it is possible to significantly narrow down the number of targets subjected to calculation/evaluation of the degree of overlap in the subsequent stage, and reduce a processing load. Note that, e.g., in the case where the number of sensors constituting the sensor network is not that large, Step S62 may be omitted and all of the sensors may be determined as the search candidates.

The matching process section 23 performs the following process on each of the sensors selected as the candidate in Step S63. First, the matching process section 23 reads the area ID of the sensor from the storage section 22 (Step S64), and on the basis of the area ID of this sensor and the area ID obtained in Step S61, calculates the degree of overlap between the sensing target area of the sensor and the sensing desired area designated by the user (Step S65).

FIG. 7 shows an example of the calculation process of the degree of overlap in Step S65. The area designated by the user (sensing desired area) is referred to as an "area 1", and the sensing target area of each sensor is referred to as an "area 2". The matching process section 23 sets a reference points in the area 1 at regular intervals so as to cover the entire area 1 (Step S70). The number of reference points a may be appropriately set according to the type of the sensor (resolution) and the size of the area and the like, and the number of reference points a may be set to, e.g., about several tens to several hundreds. The matching process section 23 determines whether or not each reference point is also included in the area 2, and counts the number b of reference points included in the area 2 (i.e., reference points included in both of the area 1 and area 2) (Steps S71 to S73). Subsequently, the matching process section 23 calculates the ratio of the reference point included in the area 1 and the area 2, i.e., the value of b/a as the degree of overlap of the sensing target area of the sensor on the sensing desired area (Step S74).

Returning to Step S66 of FIG. 6, the matching process section 23 determines whether or not the degree of overlap is not less than a predetermined threshold value, and sets a flag in the sensor when the degree of overlap is not less than the threshold value (Step S67). The threshold value can be arbitrarily set and, in the present embodiment, the threshold value is set to 0.5 as an example. (i.e., the sensor which covers 50% or more of the sensing desired area is extracted.)

The calculation/evaluation process of the degree of overlap in Steps S64 to S67 described above is executed on each sensor selected as the candidate in Step S63 (Loop R1). In addition, in the case of the sensor in which a plurality of the area IDs are set (the sensor capable of changing the target area), the calculation/evaluation process of the degree of overlap is executed on each area ID (Loop R2).

After the calculation/evaluation of the degree of overlap of all of the area IDs of all of the candidates is ended, the search result creation section 24 reads information on the sensor in which the flag is set from the storage section 22, creates the sensor list, and transmits the sensor list to the user terminal 3 (Step S68). As described above, in the sensor list, the information on each extracted sensor is described. In the case where it is necessary to change the sensing target area of the sensor in order to sense the desired area, a control parameter for the operation is also described in the sensor list. The user can determine which sensor is to be used and how the sensor is used in order to acquire desired information through comparison by looking at the list of the search result displayed on the user terminal 3.

Advantage of the Present Embodiment

According to the configuration of the present embodiment described above, the "area ID" is registered as one of the information items on the sensor, and it is thereby possible to manage the sensing target areas of all of the sensors collectively. In addition, since the area ID is defined so as to be capable of uniquely identifying the target area, unlike the conventional system, it is possible to represent the area serving as an actual detection target instead of the installation position of the sensor. Therefore, it becomes possible to search the sensor which covers the area desired by the user with high accuracy.

In addition, since the sensor is extracted by evaluating the magnitude of the degree of overlap between the area desired by the user and the sensing target area of the sensor, it becomes possible to present the sensor having a high possibility of matching the desire of the user as the search result. Further, by performing rough narrowing down of the candidate based on the installation position which requires a small calculation amount before the calculation/evaluation process of the degree of overlap is performed, it is possible to reduce the total processing load and achieve a reduction in search time.

Further, in the case where the sensing of the desired area is allowed by controlling the sensor, since the information on the control parameter of the sensor is also presented to the user, a use mode in which the user directly or indirectly controls the sensor to sense the desired area is allowed, and the convenience of the system is thereby improved.

Note that the above-described embodiment shows a specific example of the present invention, and the scope of the present invention is not intended to be limited to the specific example. For example, although the above-described embodiment describes the example in which the present invention is applied to the sensor network system, it is also possible to apply the present invention to the device network systems including the devices other than the sensor (e.g., an actuator, controller, robot, light fixture, digital signage, and display). This is because each of these devices is also similar to the sensor in that the operation is exerted on the predetermined target area and the target area does not necessarily match the installation position of the device so that the same problem as that of the case of the sensor arises. In addition, in the above-described embodiment (FIG. 7), although the overlap is evaluated by using the ratio of the reference point included in both of the area 1 and the area 2, the overlap between the two areas may also be evaluated by using other algorithms. Alternatively, instead of the overlap, it is also possible to evaluate an inclusion relationship, i.e., whether or not the sensing target area of the sensor includes the desired area of the user.

REFERENCE SIGNS LIST

1: sensor network
2: sensor management apparatus
3: user terminal
4: terminal of sensor provider
10: sensor
20: search request acquisition section
21: area ID determination section
22: storage section
23: matching process section
24: search result creation section
25: sensor registration section

The invention claimed is:

1. A device management apparatus managing a plurality of devices located at different places, comprising:
　a storage section in which information about each device is registered;
　an acquisition section which performs matching between a search condition included in the device search request and the information on each device registered in the storage section, thereby extracting each device satisfying the search condition; and
　a search result presentation section which presents an extraction result of the matching process section to a user, wherein
　an area ID capable of uniquely identifying a target area of each device is registered in the storage section as the information about the device,
　the device search request includes an area condition for identifying an area in which exertion of an operation by a device is desired by the user as the search condition,
　the matching process section determines each device to be extracted by comparing the target area identified by the area ID of each device with the area condition included in the device search request,
　the device management apparatus is at least one computer that comprises at least one processor and at least one non-transitory computer-readable medium, and
　the area ID includes data streams indicative of coordinates of a geographic position of the target area.

2. The device management apparatus according to claim 1, wherein
　the matching process section calculates a degree of overlap between the target area identified by the area ID and the area identified by the area condition, and determines the device to be extracted based on magnitude of the degree of overlap.

3. The device management apparatus according to claim 2, wherein
　position information indicative of an installation position of a device is registered in the storage section as the information about each device, and
　the matching process section narrows down devices serving as a candidate based on the installation position of each device, and then executes the extraction based on the magnitude of the degree of overlap with the candidate, obtained as a result of the narrowing down, serving as a target.

4. The device management apparatus according to claim 1, wherein, with regard to a device having a plurality of the target areas, a plurality of the area IDs corresponding to the plurality of the target areas are registered in the storage section.

5. The device management apparatus according to claim 4, wherein, with regard to the device having a plurality of the target areas, the target area of which the user can control, a control parameter used to change the target area to the corresponding target area is registered in the storage section, in association with each of the plurality of the area IDs.

6. The device management apparatus according to claim 5, wherein, when the matching process section extracts a device which requires control for changing the target area, the search result presentation section presents information about the control parameter for the device to the user together with the extraction result.

7. A device search method for searching a device satisfying a request condition from among a plurality of devices present at different places, the method causing a computer including a storage section in which information about each device is registered to execute:

acquiring a device search request from a user;

performing matching between a search condition included in the device search request and the information about each device registered in the storage section, thereby extracting each device satisfying the search condition; and presenting an extraction result of the matching to the user, wherein an area ID capable of uniquely identifying a target area of each device is registered in the storage section as the information about the device, the device search request includes an area condition for identifying an area in which exertion of an operation by a device is desired by the user as the search condition, the device to be extracted is determined by comparing the target area identified by the area ID of each device with the area condition included in the device search request in the matching, and the area ID includes data streams indicative of coordinates of a geographic position of the target area.

8. A non-transitory computer readable storage medium storing a program for causing a computer to execute a device search method for searching a device satisfying a request condition from among a plurality of devices present at different places, the computer including a storage section in which information about each device is registered, the method causing the computer to execute:

acquiring a device search request from a user;

performing matching between a search condition included in the device search request and the information about each device registered in the storage section, thereby extracting each device satisfying the search condition; and presenting an extraction result of the matching to the user, wherein an area ID capable of uniquely identifying a target area of each device is registered in the storage section as the information about the device, the device search request includes an area condition for identifying an area in which exertion of an operation by a device is desired by the user as the search condition, the device to be extracted is determined by comparing the target area identified by the area ID of each device with the area condition included in the device search request in the matching, and the area ID includes data streams indicative of coordinates of a geographic position of the target area.

9. The device management apparatus according to claim 2, wherein, with regard to the device having a plurality of the target areas, a plurality of the area IDs corresponding to the plurality of the target areas are registered in the storage section.

10. The device management apparatus according to claim 3, wherein, with regard to the device having a plurality of the target areas, a plurality of the area IDs corresponding to the plurality of the target areas are registered in the storage section.

* * * * *